United States Patent
Berry et al.

(10) Patent No.: US 9,466,881 B1
(45) Date of Patent: Oct. 11, 2016

(54) DETECTION OF WIRELESS DATA JAMMING AND SPOOFING

(71) Applicant: Exelis Inc., McLean, VA (US)

(72) Inventors: Robb Berry, Herndon, VA (US); Allen Cook, Ashburn, VA (US)

(73) Assignee: Exelis, Inc., McLean, VA (US)

( * ) Notice: Subject to any disclaimer, the term of this patent is extended or adjusted under 35 U.S.C. 154(b) by 502 days.

(21) Appl. No.: 13/621,601

(22) Filed: Sep. 17, 2012

Related U.S. Application Data

(60) Provisional application No. 61/560,449, filed on Nov. 16, 2011.

(51) Int. Cl.
*H01Q 3/00* (2006.01)
*H01Q 3/24* (2006.01)
*G01S 19/21* (2010.01)

(52) U.S. Cl.
CPC .............. *H01Q 3/24* (2013.01); *G01S 19/215* (2013.01)

(58) Field of Classification Search
CPC ........ H01Q 3/24; G01S 19/21; G01S 19/215
USPC ............................................. 342/360, 357.59
See application file for complete search history.

(56) References Cited

U.S. PATENT DOCUMENTS

| | | | |
|---|---|---|---|
| 5,574,466 A * | 11/1996 | Reed et al. | 342/359 |
| 5,752,164 A * | 5/1998 | Jones | 455/454 |
| 5,818,389 A | 10/1998 | Lazar | |
| 5,936,571 A | 8/1999 | Desjardins | |
| 6,263,208 B1 * | 7/2001 | Chang et al. | 455/456.3 |
| 6,999,796 B2 * | 2/2006 | Tiirola et al. | 455/562.1 |
| 7,233,284 B2 | 6/2007 | Velicer et al. | |
| RE41,382 E | 6/2010 | Yee et al. | |
| 7,783,246 B2 | 8/2010 | Twitchell, Jr. et al. | |
| 7,912,643 B1 | 3/2011 | Bean et al. | |
| 7,952,519 B1 * | 5/2011 | Nielsen et al. | 342/378 |
| 2006/0287822 A1 | 12/2006 | Twitchell, Jr. et al. | |
| 2007/0184852 A1 * | 8/2007 | Johnson | H04W 64/00 455/456.1 |
| 2008/0039114 A1 * | 2/2008 | Phatak | G01S 5/0252 455/456.1 |
| 2010/0105399 A1 * | 4/2010 | Akerlund | H04W 16/18 455/446 |
| 2010/0201570 A1 * | 8/2010 | Shemar et al. | 342/357.59 |
| 2011/0102259 A1 * | 5/2011 | Ledvina et al. | 342/357.59 |

* cited by examiner

*Primary Examiner* — Frank J McGue
(74) *Attorney, Agent, or Firm* — Edell, Shapiro & Finnan LLC

(57) ABSTRACT

A set of global navigation satellite system receivers is deployed in and moves about a region that may be occupied by a signal jammer or spoofer. The receivers collect truth data from spectral content of the broadcast satellite signal and, optionally, from a set of sensors associated with each receiver from which an independent determination of location can be derived. The truth data are compared with data acquired by the receivers and an alert is issued upon detection of an anomaly. The data from receivers in a region of influence of the jammer or spoofer are aggregated, integrated, and correlated to generate a two-dimensional representation of a region in which the offending signals are present.

24 Claims, 17 Drawing Sheets

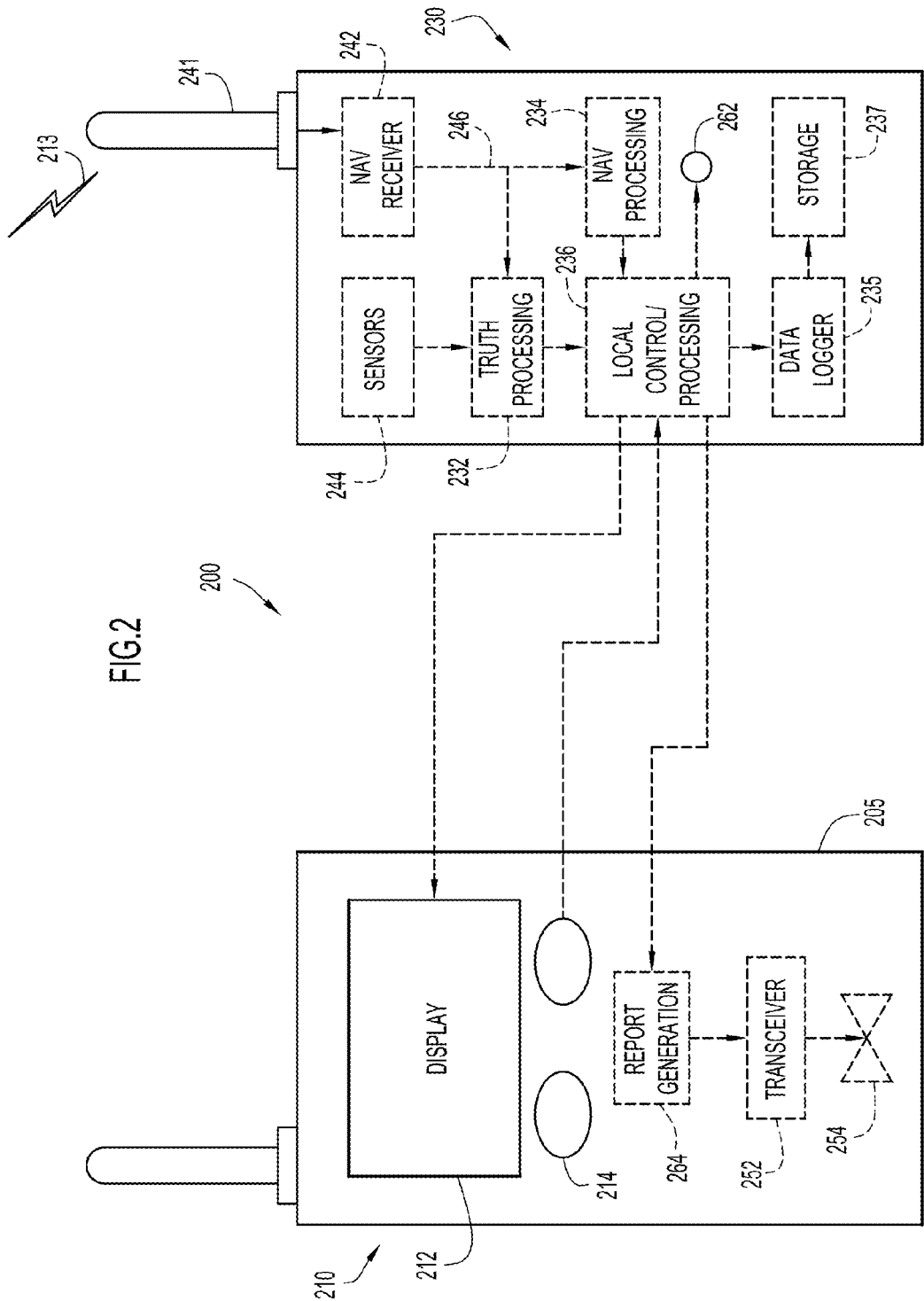

DETECTION OF WIRELESS DATA JAMMING AND SPOOFING

RELATED APPLICATION DATA

This application claims priority under 35 U.S.C. §119(e) from U.S. Provisional Patent Application No. 61/560,449 entitled "Detection of Wireless Data Jamming and Spoofing," filed on Nov. 16, 2011, the entire disclosure of which incorporated herein by reference.

BACKGROUND

The deliberate injection of interference signals in an operating region of a wireless information service is a common technique to interrupt the flow of data to a user, and can often have drastic consequences. For example, when signals of a global positioning system (GPS) are interfered with, such as by signal jamming or data spoofing, a user may find him- or herself out of position. In a battlefield scenario, proper positioning with respect to that of the enemy and that of friendly forces is often critical, and failure to comply with planned trajectories can result in damage to equipment, injury to personnel and even loss of life. Accordingly, such deliberate interference is a common element of modern warfare and has been for many decades.

As used herein, jamming refers to the generation of electromagnetic radiation with the purpose of deliberately disrupting the successful transmission of data on a communication link. Spoofing, on the other hand, refers to the generation of electromagnetic radiation that mimics a communication link with the purpose of conveying false information to a user. A simple jamming strategy for GPS is to place a jamming source at the receiver, where the GPS signal strength is around −150 dBm. A GPS jamming source needs a jammer-to-signal (J/S) ratio of at least +80 dB to jam an incoming GPS signal and introduce bit errors. By jamming a satellite's broadcast signal in the vicinity of the targeted receiver, a much smaller and less powerful jamming source is needed. Jammers exist that can be fitted into a hand-held device that can be placed essentially at will.

GPS spoofing has emerged as an ongoing threat in both military and civilian contexts. Portable GPS satellite simulators exist that can fit into the trunk of a car and are available as commercial of-the-shelf items. Again, the small size of this interference equipment affords its placement in a region at will and without the knowledge of targeted personnel. It becomes a challenge to detect the sudden appearance of jamming and spoofing efforts without deploying special equipment, which may hamper such detection in real time. In light of these challenges, the need has been felt for a technique to alert personnel, both at a local level and at a regional level, as to the presence of jamming and/or spoofing efforts.

SUMMARY

Described herein is a technique applicable to detection of service denial of an information service, i.e., a source of data that is carried over an electromagnetic carrier signal. A region of coverage of an information service transmitter is established having a spatial distribution of at least one transmitted signal parameter, such as signal power, that is known in the region of coverage. Such a distribution may be in accordance with range-squared divergence of radiation emitted by a remote transmitter, such as on a navigation satellite. At least one receiver is transported along a trajectory in the region of coverage to measure the signal parameter. A determination is made as to whether the measured spatial distribution of the signal parameter is that of the known distribution to within the degree of statistical significance. If such is not the case, an alert is generated at a local level and report data of such alerts are accumulated on a regional level. Independent measurements of position on the trajectory, such as by inertial navigation, may be implemented to determine whether the difference between the measured and known distributions is due to a jamming attempt or is due to a spoofing attempt.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

BRIEF DESCRIPTION OF THE DRAWINGS

FIG. 2 is a block diagram of a geo-positional transceiver that may be used in conjunction with the present general inventive concept;

DETAILED DESCRIPTION

Figure 1A:
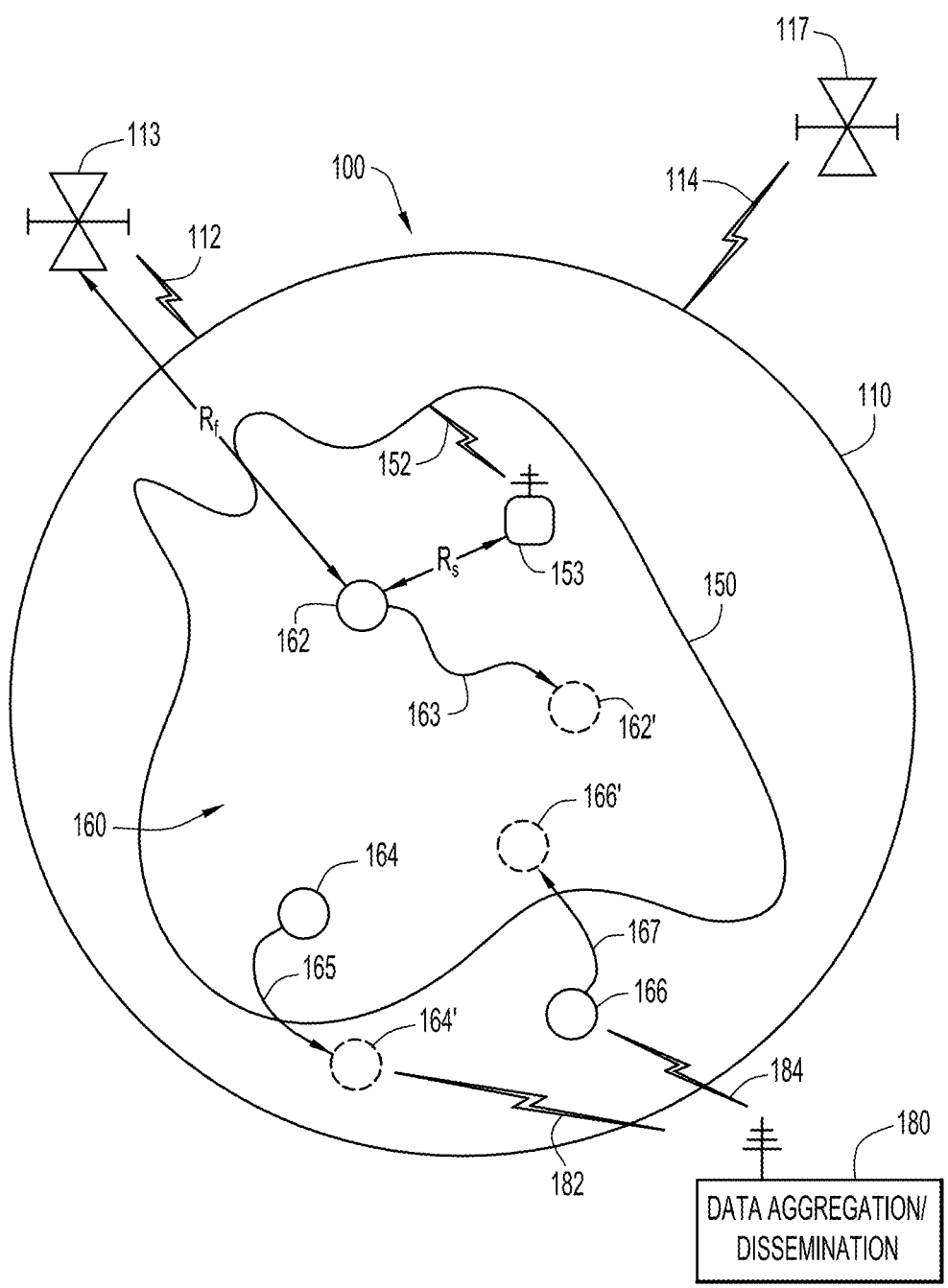
FIG. 1A illustrates an exemplary deployment scenario of embodiments of the present general inventive concept.
Figure 1B:
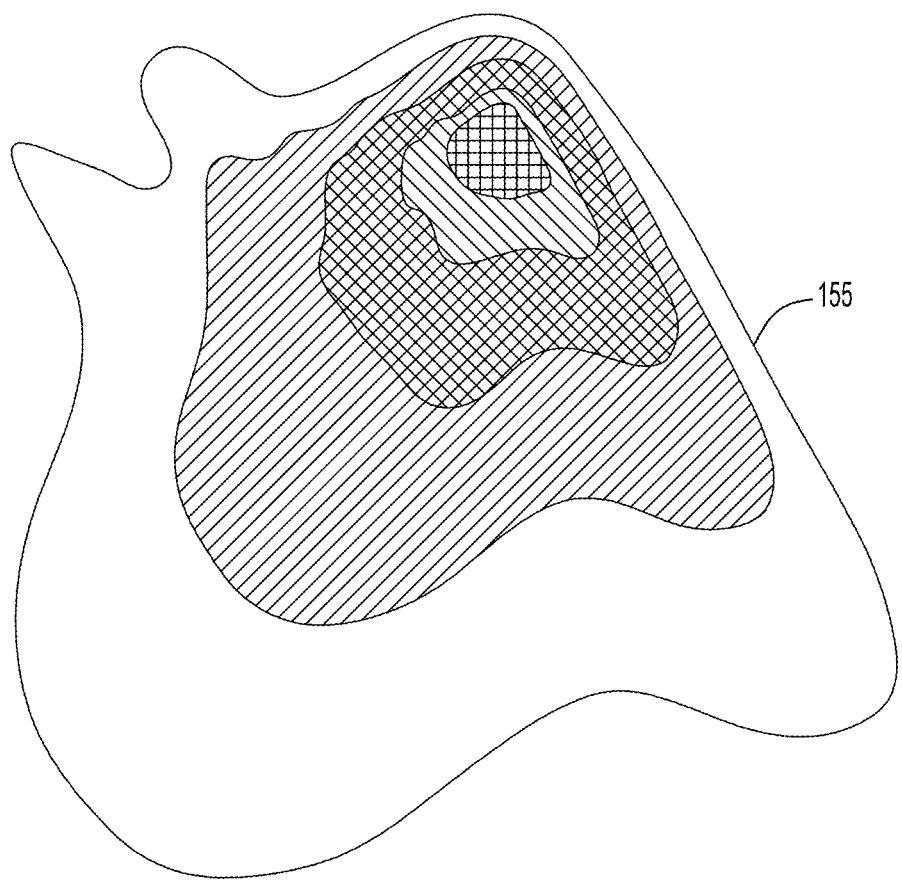
FIG. 1B-1F illustrate various footprints of jammer/spoofer implementations that can be ascertained by embodiments of the present general inventive concept.
Figure 1C:
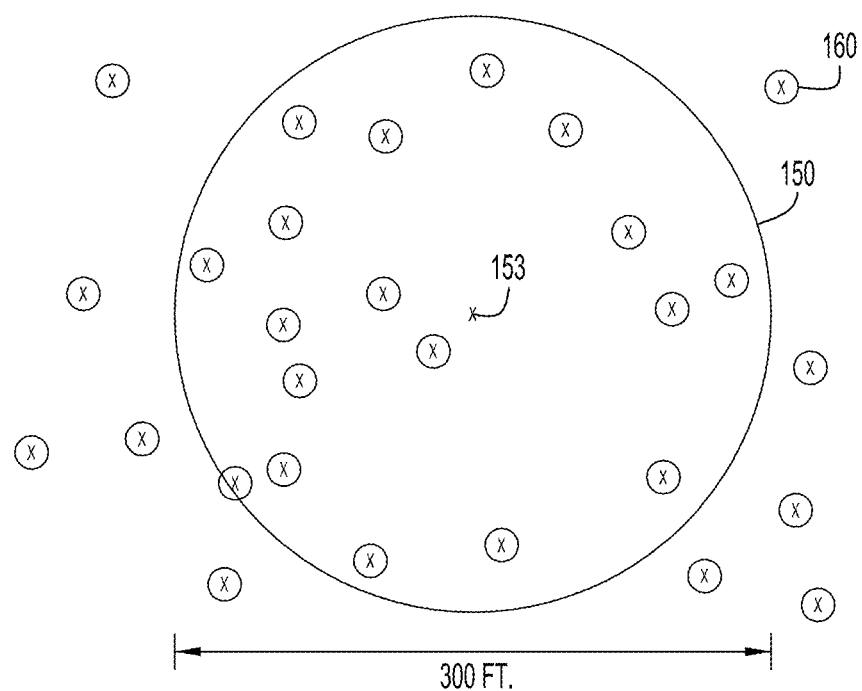
Figure 1D:
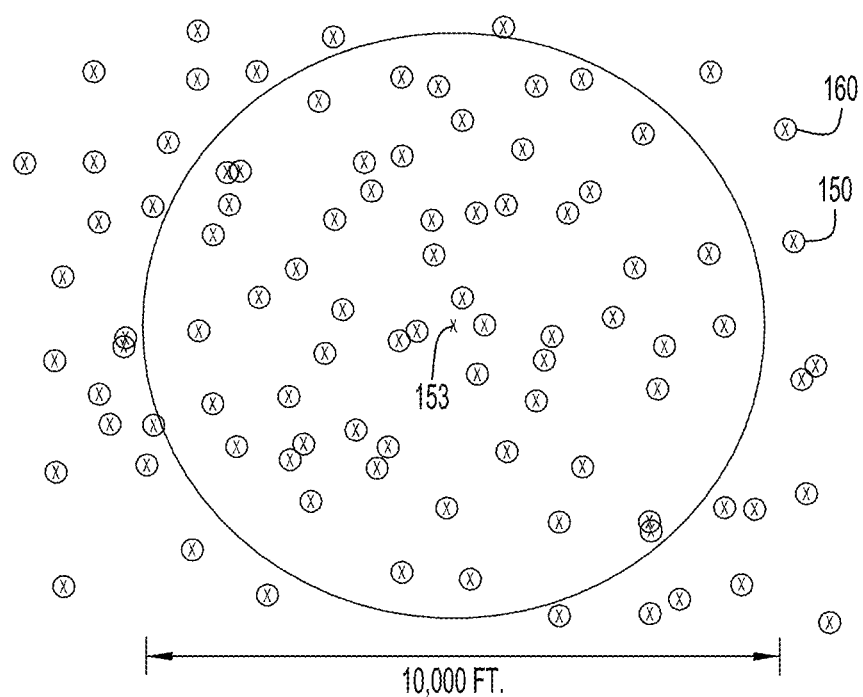
Figure 1E:
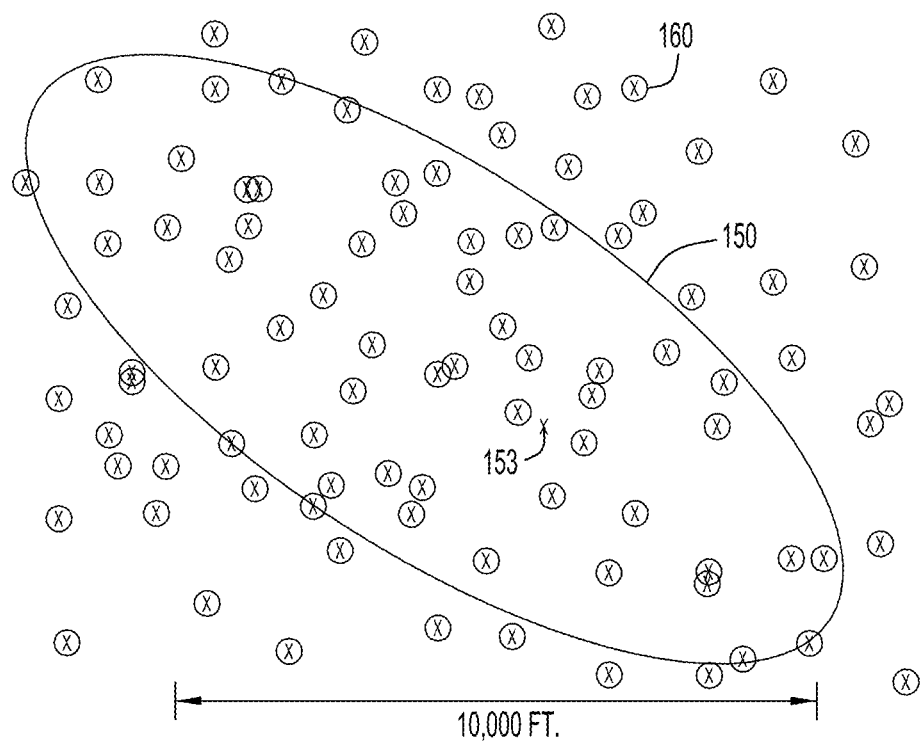
Figure 1F:
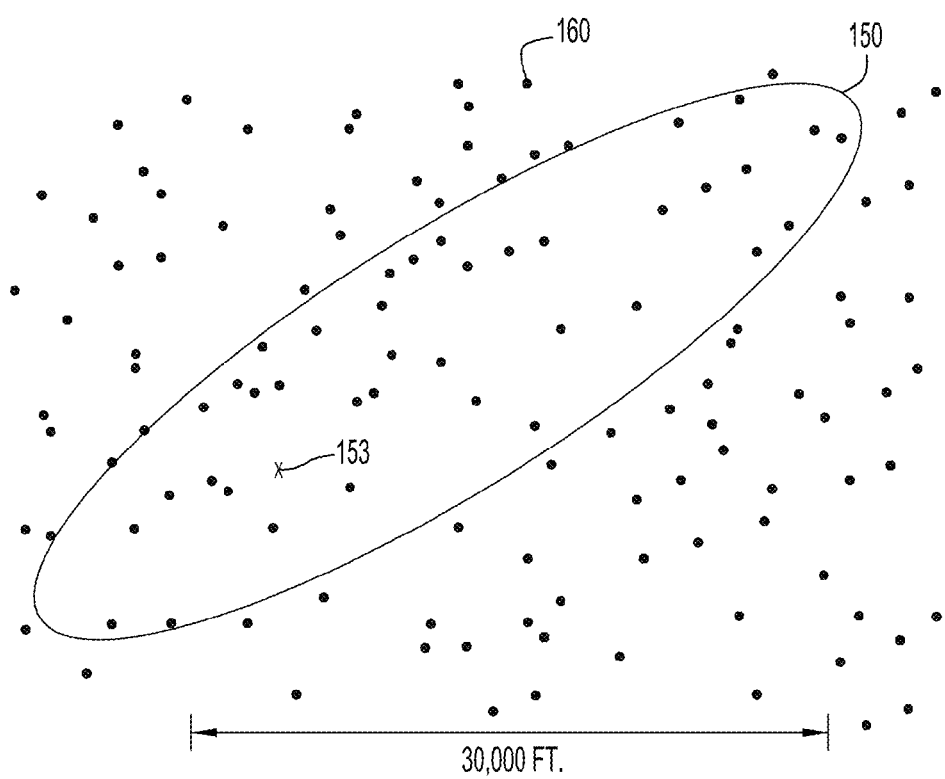

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

The techniques described herein are directed to determining whether information-bearing signals of an information service are interfered with so as to disrupt the flow of data to a user of the information service. The exemplary embodiments described herein are directed to global navigation satellite systems (GNSS), such as the global navigation system (GPS) used in the United States, although the present invention is not so limited. Upon review of this disclosure and appreciation of the concepts disclosed herein, the ordinarily skilled artisan will recognize other information services to which the present inventive concept can be applied. The scope of the present invention is intended to encompass all such alternative implementations.

In FIG. 1A, there is illustrated an exemplary service denial detection system (SDDS) 100 by which the present invention may be embodied. One or more information service data sources, exemplified by satellites 113, 117, transmit and receive information service data over communication links 112, 114, respectively, to establish a region of coverage (ROC) 110 of an information service. As used herein, information service data refers to information-bearing data conveyed over a free-space electromagnetic carrier in accordance with specifications of a service provider. In the GNSS scenario exemplified herein, the information borne in the electromagnetic carrier is that by which geographical coordinates can be computed, as is known by those skilled in the satellite navigation arts, where such information may include satellite time data and ephemeris data of each satellite used in calculating position.

Exemplary SDDS 100 includes a plurality of transceivers, each specifically referred to as transceivers 162, 164 and 166, and generally referred to as transceiver(s) 160, to process the GNSS data received thereat, and, optionally, to communicate with other system components, as will be described below. Transceivers 160 may be implemented by suitable GNSS locator devices that indicate respective geopositional coordinates thereof within ROC 110. Accordingly, each transceiver 160 establishes and maintains a communication link 112, 114 with satellites 113,117 to, among other things, receive information from which such coordinates can be determined. It is to be understood that while only two satellites 113, 117 are illustrated in FIG. 1, numerous satellites are typically deployed and may in fact be required to establish an ROC 110 over which geopositional coordinates of an individual transceiver 160 can be determined with acceptable precision. It is to be understood, as well, that although ROC 110 is illustrated as being bounded by a circle, such is solely for purposes of illustration and may not reflect any actual boundary of ROC 110.

ROC 110 may be characterized by signal power at receiver level, which is dictated by the transmitted power at the satellite, the range to the receiver from the satellite and divergence of the transmitted energy, which is proportional to $R^{-2}$, where R is the range from the transmitter to the receiver. For long ranges $R_f$, such as is the case with satellite transmission illustrated in FIG. 1A, the signal power distribution over ROC 110 is substantially constant to a degree of statistical significance, such as a specified mean and variance of the signal power. However, such constant signal power is not necessary to the invention; any known distribution of a known signal characteristic in an ROC 110 will suffice.

A service denial device (SDD) 153 may be situated in ROC 110 to interfere with the GNSS data provisioning, such as by generating jamming and/or spoofing signals 152, to establish a region of influence (ROI) 150 over which the GNSS service is denied. The bounds of ROI 150 are encompassed in ROC 110 and are determined by the effective range of SDD 153, i.e., the range over which jamming and/or spoofing can be achieved.

In exemplary SDDS 100, transceiver 160 is implemented with detection facilities to determine whether transceiver 160 is within ROI 150. For example, given that the range $R_f$ to a given satellite, say satellite 113, is quite large, the power spectral density (PSD) of the electromagnetic carrier of communication link 112 in ROC 110 is known to within noise factors and is substantially constant over moderate spans. On the other hand, the range $R_s$ to SDD 153 may be orders of magnitude smaller than $R_f$ to the extent that the received power of electromagnetic radiation 152 emitted thereby is quite variable in ROC 110. Thus, as transceiver 162 moves through, say, a trajectory 163 in ROI 150 to a new position 162', variation in received power over the trajectory may correspond to the range-squared divergence of signal 152 transmitted from SDD 153. The difference in the spatial distributions between the measured signal power and the known signal power, e.g., the range-squared divergence of the carrier signals 112, 114 may be indicative that an SDD 153 is within ROC 110.

In certain implementations, numerous transceivers 160 are located in ROC 110. As these transceivers 160 move throughout ROC 110, electromagnetic signal power levels over ROC 110 may be collected and analyzed. At any moment in time, a set of transceivers 160 may be dispersed over ROC 110 in a first spatial distribution and electromagnetic field data may be collected at each transceiver 160. The measured signal power from each transceiver 160 may be provided to a data aggregator/disseminator (DAD) 180 over wireless communication links 182, 184. In a subsequent moment, users of transceivers 160 moving in ROC 110 through respective trajectories may be dispersed in a spatial distribution different than the first and new electromagnetic signal power data may be provided to DAD 180. At DAD 180, measurements made by transceivers 160 in different spatial distributions thereof may be integrated with previous such measurements. Different moments in time may present different distributions of transceivers 160 in ROC 110 and each different distribution offers a new and distinct set of measurements of the electromagnetic signal power in ROC 110. Over time, a full map of the electromagnetic field strength over ROC 110 may be computed in a manner resembling Monte Carlo integration methods.

As transceivers 160 move about ROC 110, the footprint and power distribution over such footprint of ROI 150 may be estimated. For example, transceiver 164 may move through a trajectory 165 from a location at which high variability in power is detected to a new location 165' where the power profile is more constant. Such detection provides a measure of the spatial extent of ROI 150. A transceiver 166 may follow a reverse trajectory 167, i.e., where transceiver 166 begins outside ROI 150 and moves to a new location 166' inside ROI 150. The crossing of the boundary will be indicated by changes in power levels, although the changes will not indicate a sharp boundary as is illustrated in FIG. 1A. As more data are collected by transceivers 160, measurements of interference from jamming and/or spoofing may be processed locally and transmitted to DAD 180. DAD 180 may collect, fuse, correlate and analyze the data from all transceivers in a particular region and a map of such measurements may be generated, such as that illustrated in FIG. 1B. The map in FIG. 1B may be that of an ROI of a GNSS spoofer having a footprint 155, which is defined by detection of such spoofing by individual transceivers 160. The shaded regions in FIG. 1B indicate electromagnetic power beyond that expected from long range satellite transmission, darker shading indicating higher difference in signal power. As a result of such data aggregation and mapping, the location of the offending SDD 153 can be determined and the device may be targeted for removal or destruction.

The data aggregation and mapping discussed above may produce footprints whose size and shape may provide insight as to the type of jamming/spoofing that is taking place. For example, the footprint illustrated in FIG. 1C may be that of a small scale source deployed at ground level, and the footprint in FIG. 1D may be that of a medium scale ground- or sea-based jammer/spoofer. The oval shape of the footprint in FIG. 1E may indicate medium scale jamming by an airborne source and that illustrated in FIG. 1F may indicate large scale jamming by an airborne source. It is to be understood that regular footprint shapes, such as those illustrated in FIGS. 1C-1F may be obtained from integrating many samples from transceivers 160 over suitable time intervals and performing a data fitting technique, such as a least-squares approximation of the data to a conic section.

In certain embodiments, SDDS 100 comprises two levels of processing: a local level performed on each transceiver 160 and a regional level performed by DAD 180. At the local level, a user of a transceiver 160 may be notified of the presence of SDD 153 and to whether signal jamming or data spoofing is occurring. This information, as well as the data from which such information was derived at the local level, may be transmitted to DAD 180 for regional processing, such as to generate maps and other intelligence products which may be disseminated to the applicable community.

FIG. 2 illustrates an exemplary local level transceiver (LLT) 200 by which a GNSS embodiment of the present invention may be implemented. The functional circuitry of exemplary LLT 200 may be contained in a housing 205, which serves as a portable platform by which a user can transport the device over ROC 110. A user interface 210 may be disposed on the housing to include, for example, a display 212, on which various data, such as GNSS location data, and system control data may be displayed, and one or more user controls 214, by which LLT 200 may be operated and controlled by a user. The present invention is not limited to a particular user interface configuration; numerous configurations may be used in conjunction with the present invention without departing from the spirit and intended scope of the present invention.

LLT 200 may include a wireless navigation receiver 242 coupled to an appropriately constructed antenna 241 to receive GNSS data broadcasted over an electromagnetic carrier signal 213, such as by satellites 113, 117. Carrier signal 212 may be a radio-frequency (RF) signal at the GPS L1 frequency of 1575.42 MHz and, optionally, the GPS L2 frequency of 1227.60 MHz. The carrier signal may be down-converted by receiver 242 to an intermediate frequency (IF) signal 246, by which, when provided to navigation processor 234, the geographic longitude and latitude of the LLT 200 may be ascertained in a manner typical for such GNSS locator devices.

LLT 200 may include a plurality of sensors 244 to provide truth data. As used herein, truth data are collected and processed to provide independent verification and/or supplemental measurement of primary data, such as GNSS location data. For example, sensors 244 may provide truth data in the form of compass heading, barometric pressure, and distance traveled by which a truth data processor 232 may estimate the position of LLT 200 independently of the GNSS position computation. Truth data may also include carrier signal characteristics, such as to determine whether a received carrier signal is consistent with that from a GNSS transmitter. To that end, IF signal 246 may be provided to truth data processor 232 by which the signal characteristics, such as power spectral density, of GNSS carrier signal 213 may be analyzed.

Exemplary LLT 200 includes a local controller/processor (LCP) 236 by which the functional components thereof interoperate. For example, LCP 236 may format navigation data for display on user interface 210 and may execute functions responsive to user activation of a control 214. Additionally, data from truth data analyzer 232 and navigation data processor 234 may be provided to LCP 236, whereby the validity of the navigation data and/or the presence of a service denying device may be evaluated. LLT 200 may include a data logger 235 by which pertinent data items may sampled and stored in a storage unit 237 while the LLT 200 is being transported through ROC 110.

Upon a determination that anomalies exist between the truth data acquired by sensors 244 and navigation data generated by navigation processor 234, an alert may be generated and provided to a local user by, for example, an enunciator 262, such as a light emitting diode or audible signal generator, or by a suitably formatted message on display 212. Additionally, pertinent data that are logged by a data logger 235 and stored in a storage unit 237, as well as data regarding the type of anomaly, may be formatted into a report by a report generator 264 and transmitted to remote location, such as to DAD 180, by way of a transceiver 252 and antenna 254.

Figure 3A:
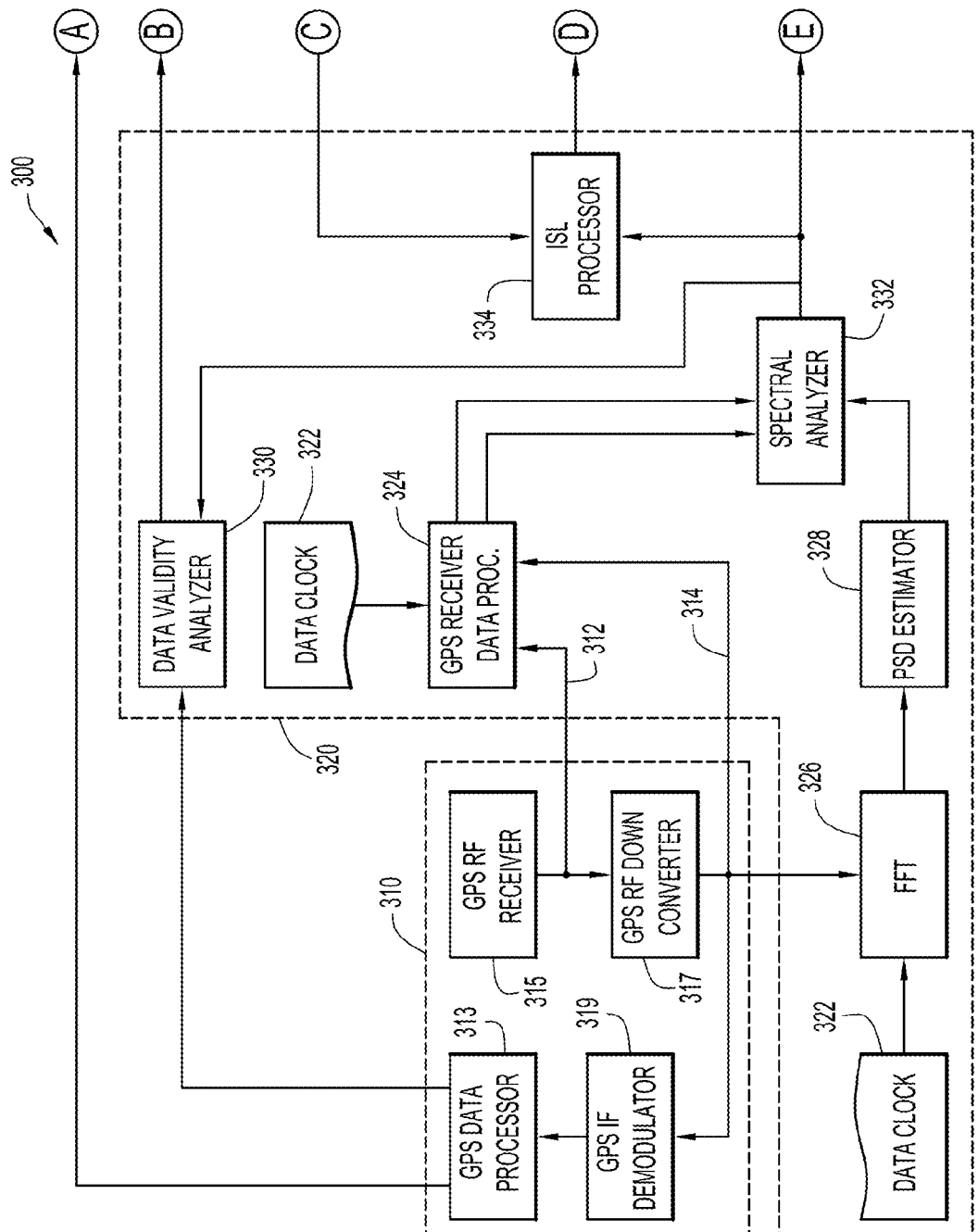
FIG. 3A-3B is a schematic block diagram of a local jammer/spoofer detection processor by which the present general inventive concept may be embodied.
Figure 3B:
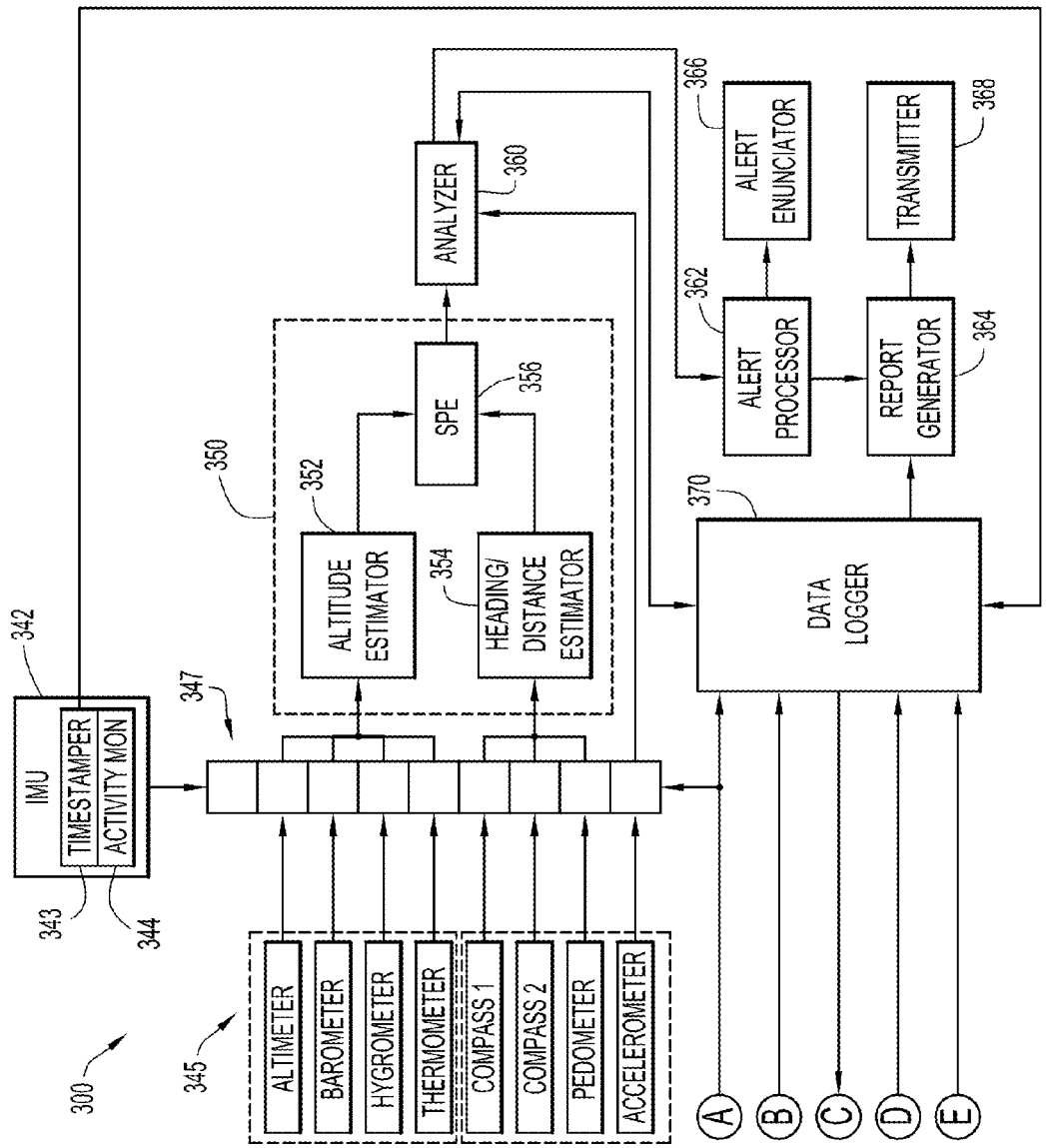

Referring to FIGS. 3A-3B, there is illustrated a local level processor (LLP) 300 that may implement GPS navigation and truth processing in individual LLTs 200. Exemplary LLP 300 includes a GPS processor 310 by which the geo-position of LLT 200 is ascertained. GPS processor may include a radio-frequency (RF) receiver 315 to receive the GPS carrier signal, a down-converter 317 by which the intermediate-frequency (IF) signal is extracted, a GPS demodulator 319 to generate a baseband digital signal in accordance with the IF signal, and a GPS data processor 313, by which GPS coordinates are computed. The functional blocks of GPS processor 310 may be implemented through standard GPS receiver modules, although it is to be understood that the present invention is not limited to any particular configuration.

In certain embodiments, GPS processor 310 provides access to RF signal 312 and IF signal 314, both of which may be provided to a signal analyzer 320. Exemplary signal analyzer 320 performs truth data processing on the received GPS carrier signal. For example, when certain characteristics of the GPS carrier signal are known, signal analyzer 320 may determine whether signals received at LLT 200 are those from a recognized transmitter. RF signal 312 and IF signal 314 may be provided to GPS receiver data processor 324, whereby various signal characteristics such as carrier-to-noise ratio (CNR), signal-to-noise ratio (SNR) and peak power at the carrier frequency are determined. Additionally, IF signal 314 may be provided to a fast Fourier transform (FFT) processor 326, from which a frequency spectrum is produced for each sample of data clock 322. The sample rate of clock 322 by which signal characteristics are determined and by which spectra are produced may be independent of the GPS satellite clock. The spectra from FFT processor 326 may be provided to a power spectral density (PSD) estimator 328, from which power spectra are determined for each sample clock period. The signal parameters computed from GPS receiver data processor 324 and power spectra may be provided to a spectral analyzer 332, by which spectral features are analyzed, as is discussed below.

Spectral data provided at the output of spectral analyzer 332 may be provided to an inverse square law (ISL) processor 334. ISL processor 334 monitors the received signal strength for effects of range-squared divergence of electromagnetic transmissions. The variation in signal power due to inverse square law effects should be negligible for normal operation when the carrier signal is coming from actual GPS satellites and no other sources. However, locally positioned transmitters, such as local jamming devices, may be in closer proximity to the receiver and, as such, significant inverse square law effects will be apparent from the spatial distribution of signal power. Such range-squared divergence of a local jamming device may be determined by comparing a measurement made at a current location on a trajectory with a measurement of a previous location on the trajectory. By collectively examining multiple sequential moving average signal power estimates, an alert may be issued to the user upon an anomaly being detected. If no statistically significant difference in the spatial distribution of the signal power is observed, no alert is generated.

GPS processed data may be provided to a data validity analyzer 330, which indicates whether valid GPS data are recoverable from the received carrier signal. If GPS data are not successfully extracted from the carrier signal, the spectral data generated by spectral analyzer 332 are analyzed to determine whether the GPS power level and SNR are adequate for data acquisition. If power levels are sufficient and the spectral envelope exhibits excessive spikes or other superfluous signal activity, the GPS signal is considered to be jammed and an alert to such may be issued. However, if the GPS signal levels are insufficient, the user may be alerted that the location of LLT 200 is within a spatial null, or otherwise outside the ROC.

Referring to FIG. 3B, exemplary data logger 370 maintains historical logs of pertinent system and processing data for purposes of report generation and internal processing. The present invention is not limited to the types of data that are logged, as such will vary on an implementation basis. In the example illustrated in FIG. 3B, GPS data, a data validity flag, ISL processed data and spectral data are logged for each time sample generated by data clock 322. In certain embodiments, stored data may be purged when no longer needed, such as during periods where GPS operations are interference free.

In certain embodiments of the invention, an independent position measurement is made, such as through an inertial navigation processor 350. To that end, LLT 200 may be provided with numerous sensors 345, each providing a datum from which position may be derived. For example, an altimeter, a barometer, a hygrometer and thermometer may be used to determine altitude, such as by altitude estimator 352, and a compass, pedometer and accelerometer may be used to determine a heading, distance traveled and velocity, such as by heading/distance estimator 354. Numerous techniques to determine altitude, heading, distance and velocity from such sensor readings can be used in conjunction with the present invention without departing from the spirit and intended scope thereof. Detailed description of such estimation techniques are omitted for purposes of conciseness.

The altitude estimate and heading/distance estimate may be provided to a statistical position estimator (SPE) 356 by which a current position may be established. For example, SPE 356 may implement a dead reckoning computation of position, such as used in conventional inertial navigation techniques, whereby the current position is determined from knowledge of the previous position and distance and direction traveled therefrom.

Each sensor 345 may be coupled to a switch 347, which may be activated through activity monitor 344 in an inertial measurement unit (IMU) 342. The activity monitor 344 may be activated when IMU 342 detects motion and may be deactivated during periods of inactivity. Additionally, IMU 342 may generate a timestamp, such as by timestamper 343, when activity monitor 344 is activated and such timestamp may be logged in data logger 370.

Exemplary LLP 300 includes an analyzer 360 by which the presence and type of an SDD 152 in the vicinity of the corresponding LLT 200 is determined. To that end, analyzer 360 may receive truth data, such as independent position estimates and carrier signal characteristics, with which to compare and scrutinize GPS position reported by GPS data processor 313. For example, analyzer 360 may compare the position computed from the inertial navigation processor 350 with that computed by GPS data processor 313 to determine whether there is a statistically significant difference therebetween. If so, the signal characteristics may be evaluated to determine whether uncharacteristic and/or abnormal power spectral features are present in the carrier signal. If a statistical difference in position is noted and spurious signal characteristics are also present, analyzer 360 may recognize such state as that of a spoofing attempt. If, as another example, data cannot be read from the GPS carrier signal and uncharacteristic or abnormal signal features are present in the carrier signal, analyzer 360 may recognize such state is that of a jamming attempt. The determination of spoofing and/or jamming is provided to an alert processor 362, which provides an appropriate alert indication, e.g., whether spoofing of jamming is occurring, to alert enunciator 366, by which the user of LLT 200 is made aware of the condition. Additionally, alert processor 362 may provide an indication of the type of alert, the time of the alert, etc., to report generator 364. Report generator 364 may retrieve the pertinent logged data from data logger 370 and format a suitable report, which may be transmitted by a back-channel radio transmitter 368.

Figure 4:
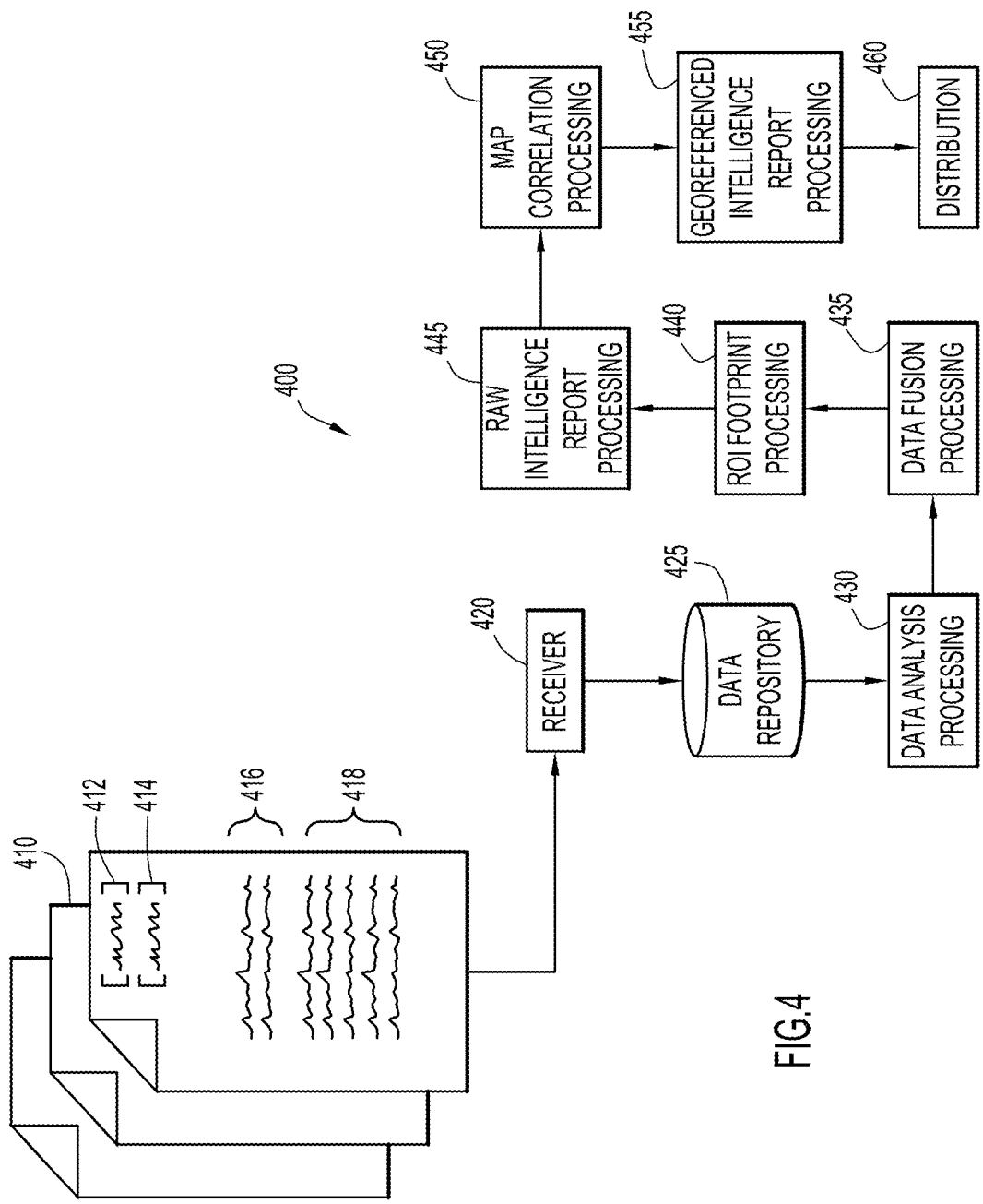
FIG. 4 is a schematic block diagram of a regional jammer/spoofer detection processor by which the present general inventive concept may be embodied.

In FIG. 4, an exemplary regional DAD 400 is illustrated. Upon an alert at any LLT 200 within the region for which DAD 400 has responsibility, a report 410 is generated and transmitted to DAD 400 where it is received by a back-channel receiver 420. The present invention is neither limited to a particular file format for reports 410 nor to the report content. The reports 410 should contain sufficient information to provide the intelligence requested by the community for which DAD 400 serves. For purposes of description and not limitation, report file 410 may contain an LLT identification 412, a timestamp 414 indicating a time of the alert, various signal parameters, alert codes, processing variables, etc., 416 and power spectral data 418. The reports 410 may be stored in a data repository 425 for further analysis and archiving. A data analysis processor 430 may retrieve data from data repository 425 and perform time series analyses and moving average processing for each data file within the time interval being analyzed. The processed data may be provided to a data fusion processor 435 by which data from individual LLT's are correlated in space and time. As described above, numerous LLT's may be within an ROC and may be constantly in motion therein. At any moment in time, there is a spatial distribution of such LLT's, each providing a unique sample of signals received thereat. These data may be provided in reports 410 and assembled by data fusion processing 435 to produce Monte Carlo-like samples of the ROC. These data are continuously updated, at each time interval a new Monte Carlo sample is provided and a moving average of the signals in ROC 110 may be provided to ROI footprint processor 440. Footprint processor 440 may employ data fitting techniques, such as least-squares data fitting, to determine the extent and shape of the ROI of a particular SDD. The footprint may be provided to a raw intelligence report processor 445, a map correlation processor 450, and a geo-referenced intelligent report processor 455. At any point in the reporting process, suitable reports may be provided to the community through distribution processor 460.

Figure 5A:
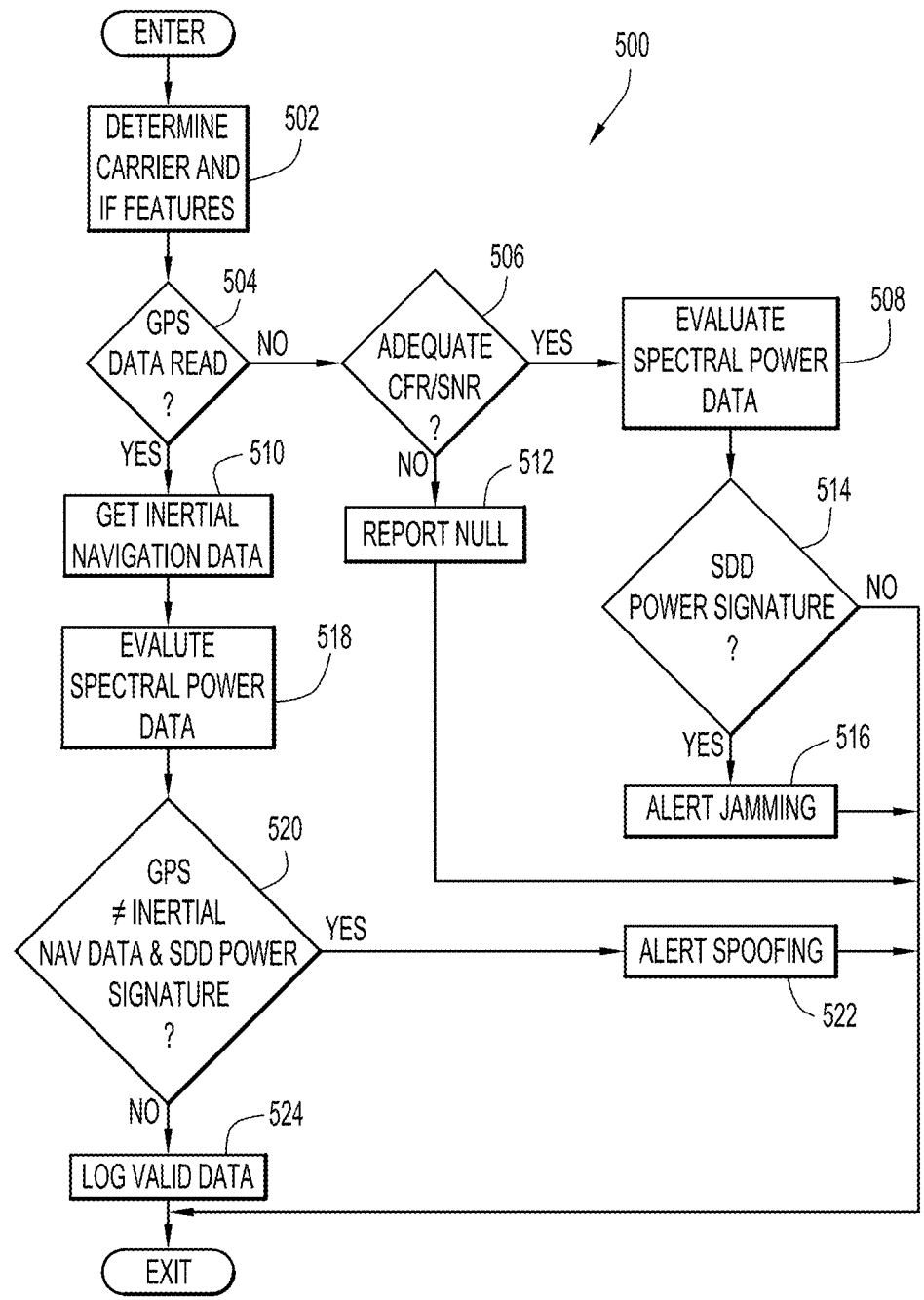
FIG. 5A is a flow diagram of a local jammer/spoofer detection process by which the present general inventive concept may be embodied.
Figure 6:
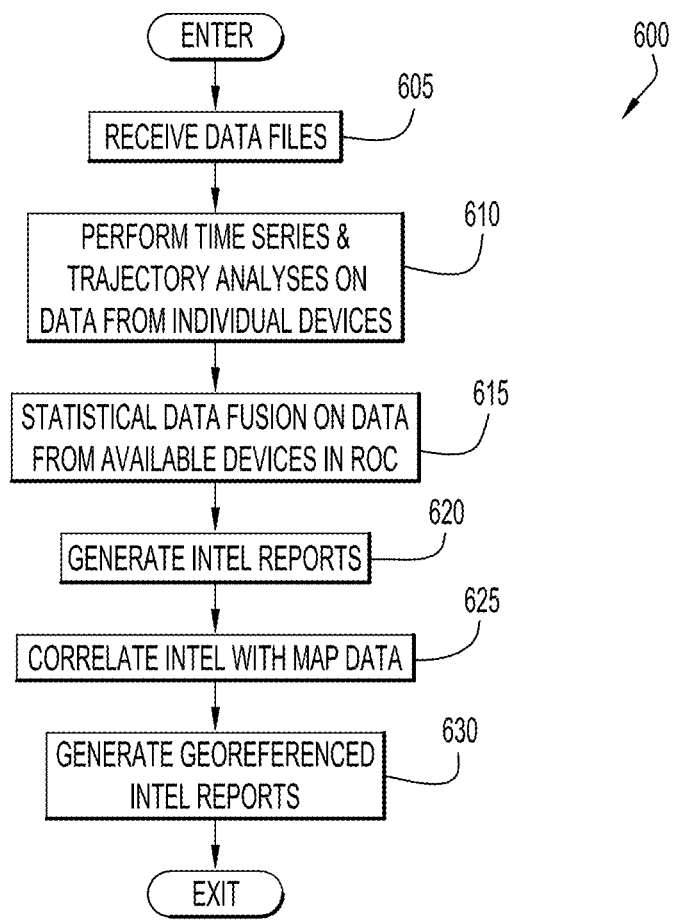
FIG. 6 is a flow diagram of a regional jammer/spoofer detection process by which the present general inventive concept may be embodied.

FIG. 5A illustrates exemplary local level data processing 500 and FIG. 6 illustrates exemplary regional level data processing 600. Although entry and exit points are illustrated in the flow charts of FIG. 5A and FIG. 6, such is for descriptive purposes only. Processes 500 and 600 may be continuously performed, and exiting and/or reentry may only be necessary upon a change in operational state of the equipment, such as by the removal of power.

In local level process 500, signal features of the carrier signal and intermediate frequency signal are extracted in operation 502. Such may include the determination of, among others, CNR, SNR, power spectral density, spectral envelope, peak power and significant power in spectral regions outside the main lobe of carrier signal. In operation 504, it is determined whether GPS data can be read from the carrier signal. If not, it is determined whether there is adequate signal-to-noise ratio for data acquisition, as illustrated at operation 506. If there is insufficient signal strength, a signal null is reported indicating to the user that the LLT is located in a position where satellites cannot be tracked. If, at operation 506, it is determined that there is significant or adequate signal strength, the spectral power at and around the carrier frequency is examined to determine the presence of a service denial device power signature. Such evaluation, illustrated at operation 508, may include evaluating the signal strength at different locations on a trajectory to determine whether signal divergence is that of satellite or of a transmitter closer to LLT. Additionally, spectral power in different spectral regions may be evaluated to determine the presence of strong or significant spurious signals which may indicate the presence of a local transmitter that is different than that used on GPS satellite. If the power signature of an SDD is present, as determined in operation 514, a jamming alert 516 is issued to the local user and a report of such is formatted and sent to regional process 600.

Figure 5B:
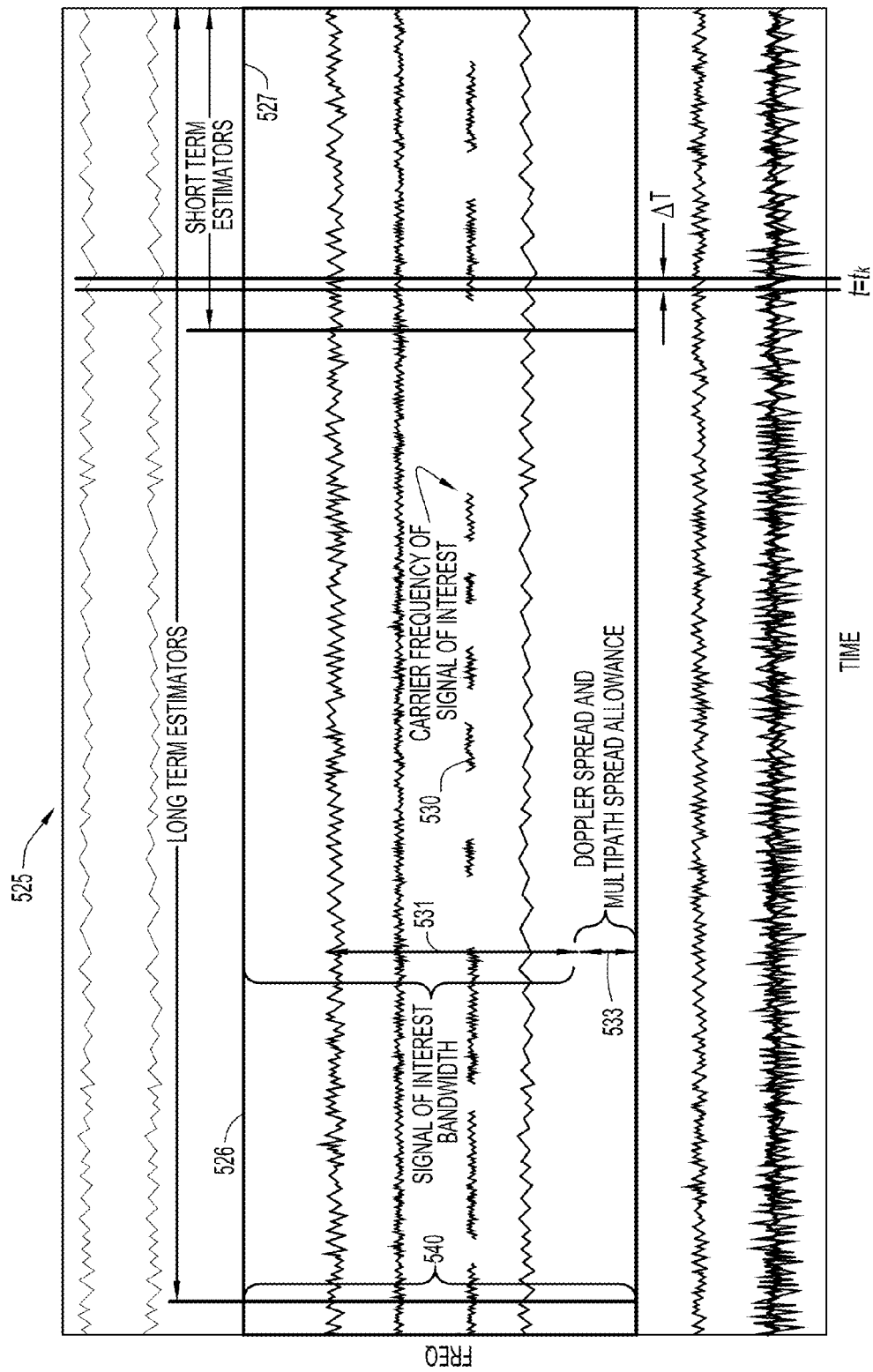
FIG. 5B is a spectrogram for explaining exemplary analyses performed by the local jammer/spoofer detection process illustrated in FIG. 5A.

Various of the signal features described above may be obtained through spectrographic analysis. In FIG. 5B, a spectrogram 525 is illustrated that represents temporally ordered frequency spectra. That is, for each time period ΔT, a frequency spectrum 538 is generated from RF and/or IF signals and the spectra are assembled in a temporal sequence to form spectrogram 525. It is to be understood that while spectrogram 525 is graphically illustrated in FIG. 5B for purposes of description, the spectrogram may be stored as digital data in onboard storage 237 without being actually rendered as a graphic.

The signal of interest in the analysis described with reference to FIG. 5B is that of the RF carrier frequency 530, although similar analyses may performed on other signals of interest. The bandwidth 531 of carrier frequency 530 and an associated anticipated Doppler and multipath frequency spread 533 may be used to define an analysis band 540 centered on carrier frequency 530. For purposes of analysis, temporal bounds in spectrogram 525 may be established to define analysis windows, illustrated in FIG. 5B as long term estimator window 526 and short term estimator window 527.

In certain embodiments, spectral envelopes are obtained from spectrogram 525, which are analyzed to determine main lobe characteristics around the carrier frequency, using both a short term and a long term moving window average, and signal bandwidth using another set of short term and long term moving average windows. The spectral envelope characteristics may be used to determine the respective mean values and variances of average power, peak power and deviations in frequency for each of the four moving average windows. The ordinarily skilled artisan will appreciate that the characteristics of the GPS signal is known a priori, i.e., has fixed parameters that provide reliable characterizations of the true GPS signal in the frequency domain. For example, the spacing of the spectral nulls the spectral envelope of a true GPS signal is a function of the symbol rate, which is known, and of the duration of a single symbol, which is also known. Using the expected spectral envelope and the a priori interval of expectation for the peak power values, interfering sources can be identified in time, energy, and spectral location.

Returning to FIG. 5A, if GPS data are successfully read in operation 504, inertial navigation data may be collected in operation 510 and the spectral power data may be evaluated in operation 518 in a manner similar to that in operation 508. In operation 518, it is determined whether the GPS data match the inertial navigation data and whether the power signature is that of an SDD.

Figure 5C:
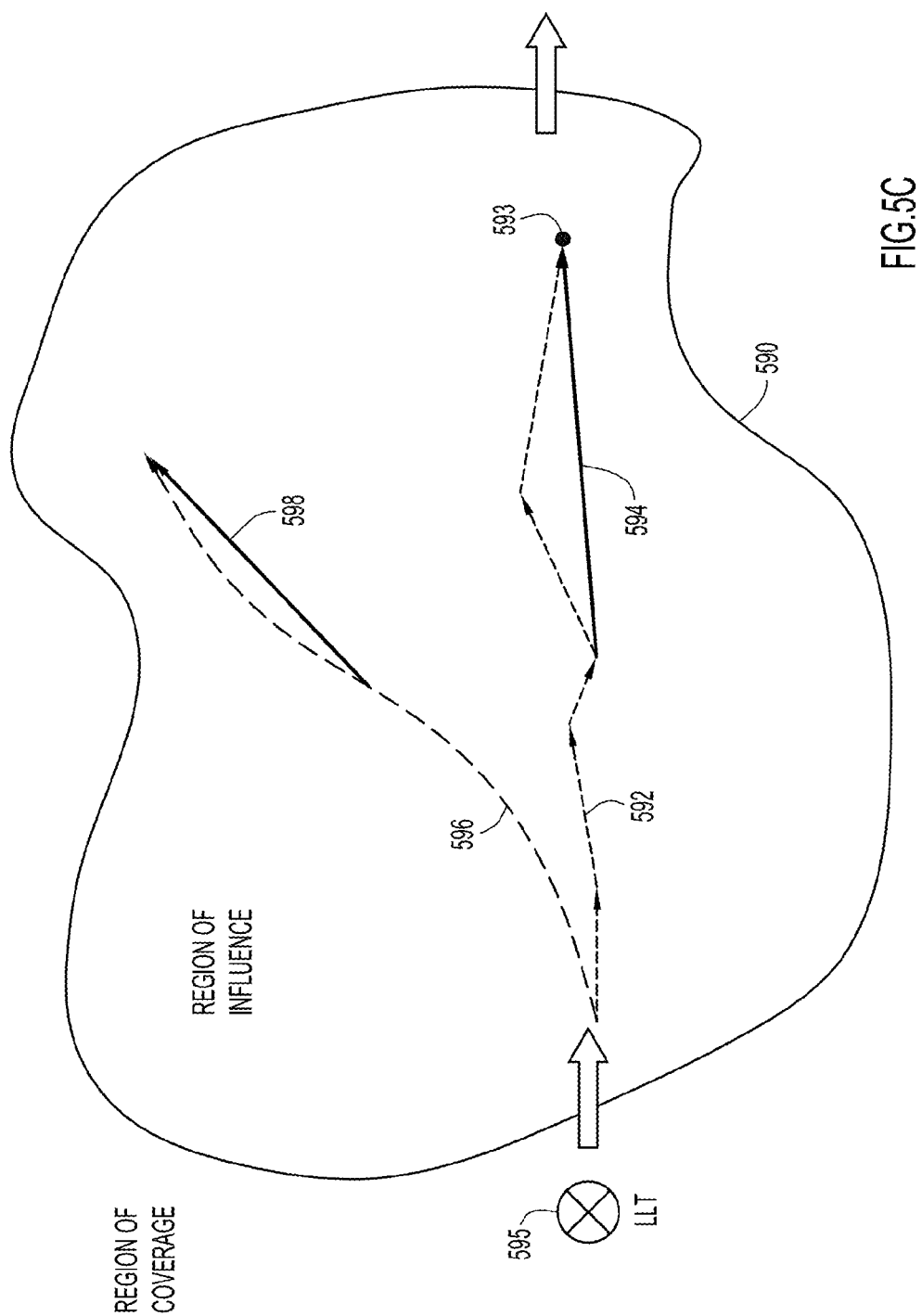
FIG. 5C is a diagram of exemplary trajectory analysis performed by which the local jammer/spoofer detection process illustrated in FIG. 5A.

FIG. 5C is a conceptual diagram illustrating an exemplary determination of spoofing as might be conducted in operation 518. In the illustrated scenario, a user of LLT 595 enters the ROI 590 and proceeds along a trajectory 592, which can be tracked by an inertial navigation processor, e.g., inertial navigation processor 350 in FIG. 3. Meanwhile, however, the GPS data being acquired by LLT 595 may indicate a trajectory 596. Inertial navigation processor 350 may estimate a location and heading, i.e., trajectory vector 594, as LLT 595 proceeds along trajectory 592. Trajectory vector 594 may be periodically compared to the GPS location and heading, i.e., GPS trajectory vector 598, reported on LLT 595. Trajectory vectors 594, 598 may be computed at various locations along trajectory 592 and the difference between the vectors 594, 598 can be determined from parameters defining each, e.g., position and heading. At some point 593 along trajectory 592, analyzer 360, for example, may determine that the inertial navigation data determined by SPE 356, as characterized by vector 594, differs from the GPS data, as characterized by vector 598 such that, to a statistical likelihood established by, for example, a predetermined difference threshold between statistical qualities, e.g., mean headings over a moving average window, trajectory 596 as indicated by the GPS data is not trajectory 592 followed by LLT 595. Once such a statistically significant difference between the GPS data and the inertial navigation data has been determined, and the power signature is that of an SDD, as determined in operation 518 of FIG. 5A, a spoofing alert 520 may be generated and provided to the local user as well as to the regional process 600. If GPS data and inertial data match, the GPS data can be considered as valid and it is logged as such in operation 522.

An exemplary regional data processing process 600 is illustrated in FIG. 6. Data files from individual LLTs are received in operation 605 and time series, moving average trajectory analyses are performed on individual files in operation 610. In operation 615, the trajectory data and individual signal characteristics on the trajectory from each LLT are assembled into a single regional signal profile in a manner similar to the Monte Carlo integration technique discussed above. By such, a map of the ROI, such as that illustrated in FIG. 1B, may be generated and is periodically updated to provide continuous monitoring of changing conditions in ROC. The fused data may be used to generate intelligence reports in operation 620, correlated with geographical map data in operation 625 and geo-referenced intelligence reports may be generated in operation 630. Intelligence reports may be distributed to those interested parties depending on the implementation.

Figure 7:
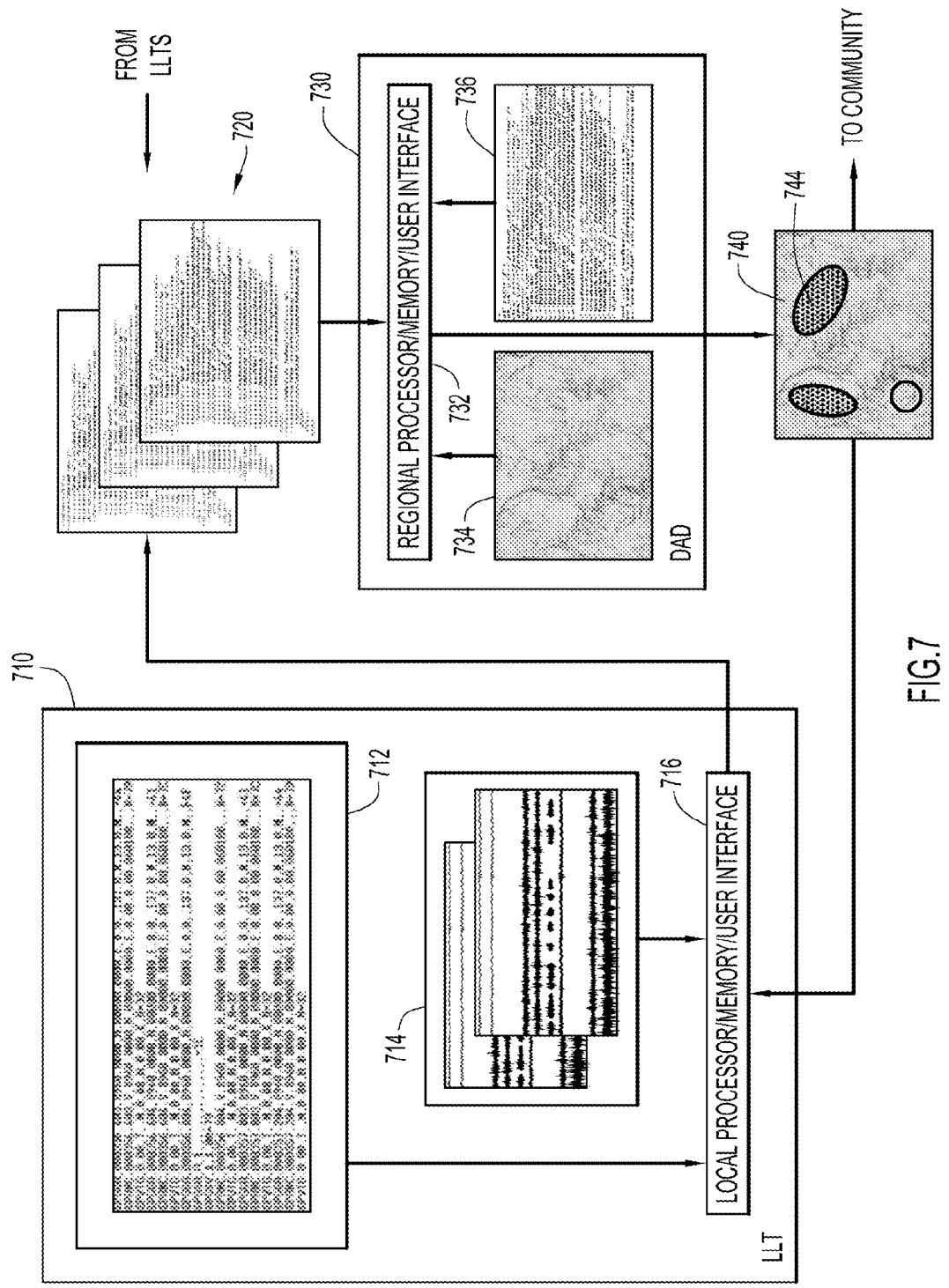
FIG. 7 is a block diagram illustrating exemplary regional and local data collection and dissemination by which the present general inventive concept may be embodied.

FIG. 7 illustrates exemplary intelligence collection, analysis and distribution. As illustrated in the figure, LLT 710 includes a processing system 716 that may include a processor, such as a microprocessor or microcontroller, memory and a user interface including user controls and a display device. Processing system 716 may be suitably configured to implement local level detection and analysis, such as that illustrated in FIG. 5 as process 500. DAD 730 may include a similar system 732 to perform, for example, process 600.

As LLT 710 is moved in an ROC, spectral data 714 may be collected and analyzed as described above. Such analyses may indicate a spectral signature of an SDD, e.g., spatial variations in signal strength that are inconsistent with anticipated $R^{-2}$ signal strength. Additionally, LLT 710 may decode GPS data 712, provided such decoding is not prevented by the presence of a jamming signal. GPS data 712 and spectral data 714 may be provided to processing system 716, where the determination of jamming and/or spoofing may be determined, as described above. LLT 710, as well as other LLTs 710 in communication with DAD 730, generates report files 720 that include, among other things, information regarding jamming and/or spoofing events, as described above with reference to FIG. 4. Report files 720 may be stored on the LLT 710 from which they are generated, as well as being transmitted to DAD 730. Report files 720 from multiple LLTs 710 are collected at DAD 730 and the events recorded therein may be analyzed and correlated in space and time to determine the locations and boundaries of ROIs in the ROC to which DAD 730 is assigned. The results of the analyses, representatively illustrated by report data 736, may be disseminated in a variety of formats, each in accordance with the requirements of the destination platform. In certain embodiments, the report data may be geo-referenced in accordance with the trajectories traversed by LLTs 710. The geo-referenced data may be overlaid onto map data 734 to produce situational awareness data 740 indicating relevant ROIs 744, which may be distributed to the pertinent community. Additionally, situational awareness data 740 may be provided to LLTs 710 by which a user thereof is made aware of ROIs in surrounding regions. Report data 720 and situational awareness data 740 may be maintained on LLTs 710 for a period of time established by the user, such as a user-selected expiration time.

Figure 8:
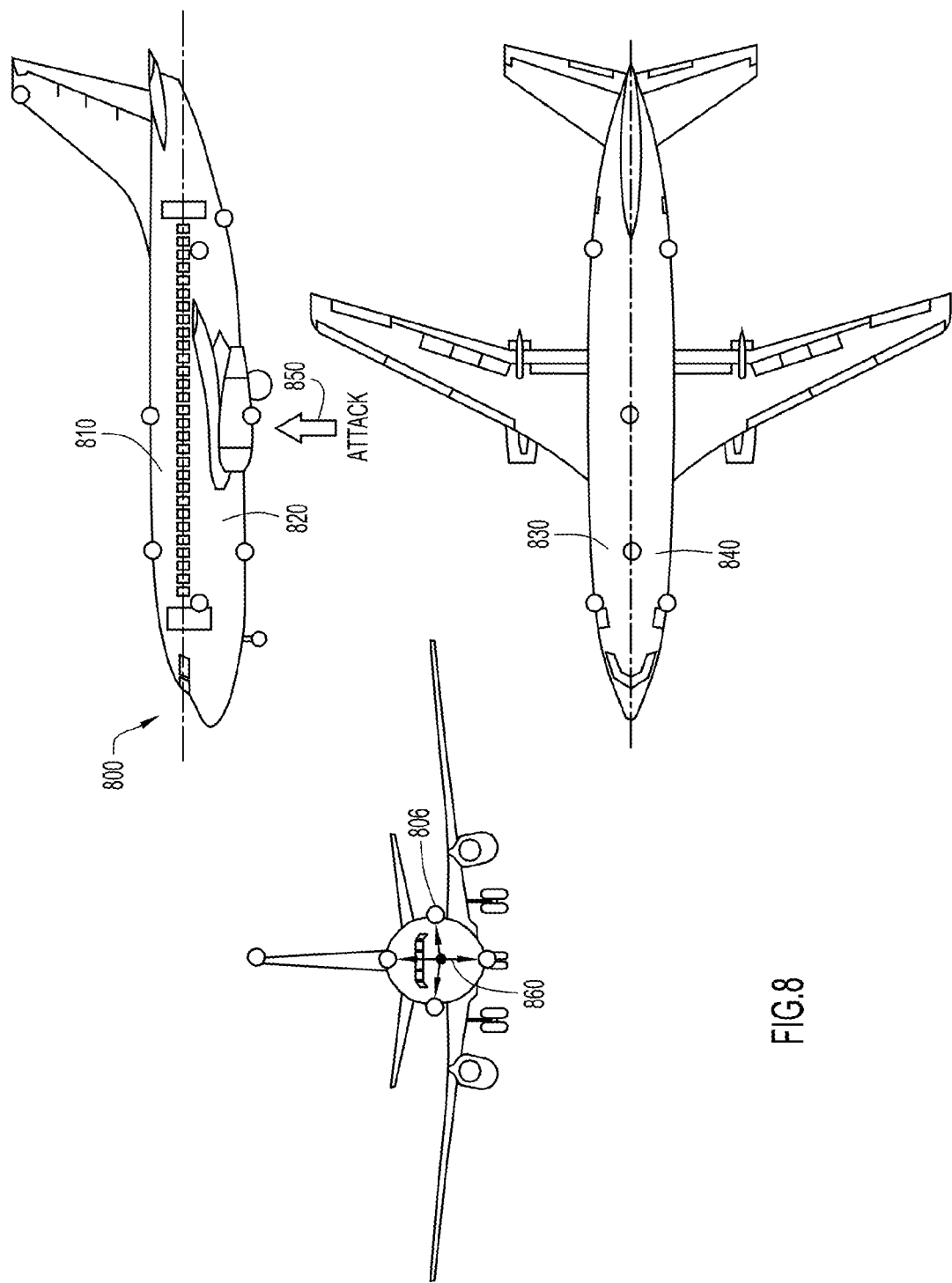
FIG. 8 is a diagram of an exemplary airborne jammer/spoofer detection system by which the present general inventive concept may be embodied.
Figure 9:
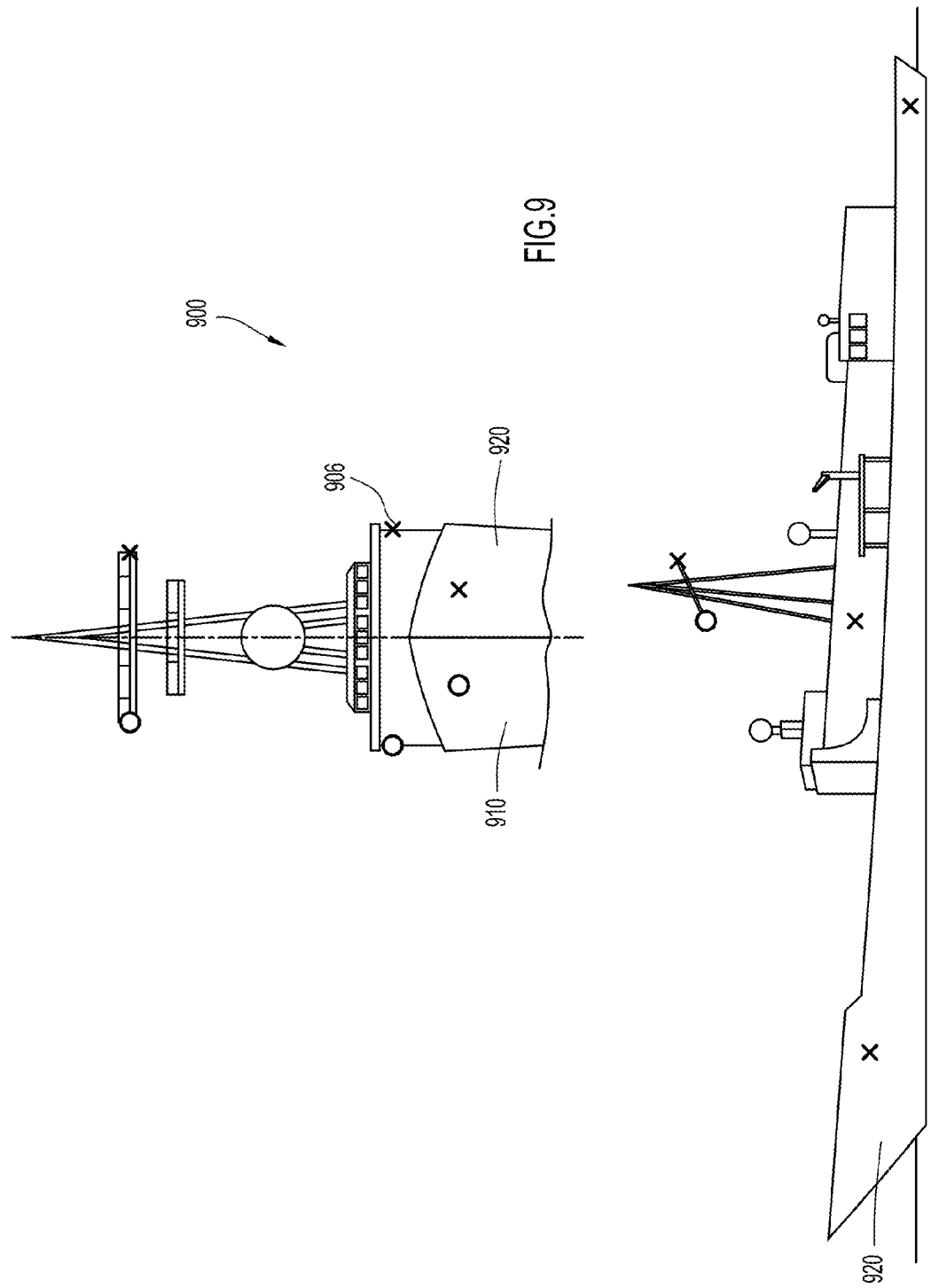
FIG. 9 is a diagram of an exemplary seaborne jammer/spoofer detection system by which the present general inventive concept may be embodied.

In certain embodiments, such as in FIG. 8 and FIG. 9, individual LLTs may be distributed on a larger moving platform, such as an airplane 800 or a ship 900. Referring to FIG. 8, LLTs 806 may be distributed in different octants 810, 820, 830, 840. Spoofing and/or jamming signatures, such as those described above, may be detected in separate octants as having different spatial distributions of signal power. Accordingly, the direction and type, i.e., airborne or ground-based, of SDD may be determined through an octant-by-octant analysis as the aircraft moves along its trajectory. A similar configuration may be applied to ship 900, although the LLTs 906 may be distributed in different half-sections or quadrants, as opposed to octants.

When embodied in a distributed fashion, such as is illustrated in FIGS. 8 and 9, a determination can be made as to whether spoofing and/or jamming is being attempted from outside or inside the vehicle. When the origin of an attack is outside the vehicle 800, the LLTs 806 in certain quadrants may detect attack signatures that are stronger than at the LLTs 806 in other quadrants. For example, as illustrated in FIG. 8, an attack 850 from beneath aircraft 800 would manifest itself as jamming/spoofing signals in quadrant 820 that are different from those measured in quadrant 810. On the other hand, when the attack occurs inside aircraft 800, such as is illustrated at attack 860, the relative signal strength measured at LLTs 806 would be substantially equivalent.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
    a receiver to receive a free-space electromagnetic carrier signal from a transmitter with at least one other receiver, signal power of the carrier signal being distributed over a region of coverage of the transmitter per a known spatial distribution;
    an analyzer to compare an actual spatial distribution of the signal power of the carrier signal in the region of coverage with the known spatial distribution of the signal power of the carrier signal in the region of coverage as the receiver is transported along a trajectory therein independently of another trajectory along which the other receiver is transported, the actual spatial distribution being estimated from samples of the spatial distribution of the signal power, each of which comprising concurrent measurements of the signal power by the receiver and the other receiver, the actual spatial distribution of the signal power being continually re-estimated from additional samples of the spatial distribution of the signal power as the receiver and the other receiver are transported along the trajectory and the other trajectory, respectively; and
    an interface to alert a user responsive to affirming that a difference between the actual and known spatial distributions of the signal power meets a criterion.

2. The apparatus of claim 1, wherein the analyzer compares the actual distribution of the signal power with a known range-squared divergence of the signal power of the carrier signal from the transmitter as the known distribution of signal power.

3. The apparatus of claim 2, wherein the receiver attempts to extract data from the carrier signal and generates a jamming alert responsive to a failure to extract the data from the carrier signal and affirming that the difference between the actual and known distributions of the signal power corresponds to that of range-squared divergence of another transmitter located closer to the receiver than the transmitter.

4. The apparatus of claim 3, wherein the analyzer includes a power spectral density estimator to generate the measurements of the signal power for locations along the trajectory as the receiver is transported thereon.

5. The apparatus of claim 4 further comprising:
a navigation processor to determine a geographic location of the receiver from information borne in the carrier signal as the receiver moves along the trajectory;
an inertial navigation processor to determine the location of the receiver on the trajectory independently of the determination of the geographic location by the navigation processor; and
a truth processor to compare the location on the trajectory determined by the inertial navigation processor with the geographic location of the receiver determined by the navigation processor, and to generate a spoofing alert responsive to affirming that the location on the trajectory determined from the inertial navigation processor fails to coincide with the location determined by the navigation processor.

6. The apparatus of claim 5, wherein the inertial navigation processor includes:
a plurality of sensors to generate respective sensor signals responsive to the receiver being transported along the trajectory;
a heading/distance estimator to receive the sensor signals from the sensors and to determine therefrom a heading and distance from a previous location on the trajectory; and
a position estimator to determine the location on the trajectory from the previously determined location thereon and a change in the heading and distance therefrom determined by the heading/distance estimator.

7. The apparatus of claim 6, further comprising:
a report generator to format for transmission predetermined report data from the receiver and the analyzer upon an alert condition, the report data including the measurements of the signal power from the analyzer;
a local transmitter to transmit the report data to a regional receiver; and
a housing to house therein the receiver, the analyzer, the interface, the report generator and the local transmitter to form a local level transceiver that is transportable over the trajectory of the receiver.

8. The apparatus of claim 7, further comprising:
a plurality of the local level transceivers at least one of which including the other receiver;
a data aggregator to receive through the regional receiver the report data from corresponding local level transceivers at which the alert condition is present.

9. The apparatus of claim 8, wherein the data aggregator includes a regional data processor to assemble the report data from each of the local level transceivers into the corresponding samples of the signal power and to integrate past and present samples of the signal power into the estimates of the actual spatial distribution of the signal power.

10. The apparatus of claim 9, wherein the regional data processor re-estimates the actual spatial distribution of the signal power by integrating report data from alert reporting local level transceivers at predetermined temporal intervals.

11. The apparatus of claim 10, wherein the regional data processor determines from the estimates of the spatial distribution of the signal power a region of influence of a service denial device in the region of coverage.

12. The apparatus of claim 11, wherein the data aggregator includes:
a footprint processor to determine a location and source type of the service denial device from characteristics of the region of influence.

13. The apparatus of claim 8, wherein the plurality of local level transceivers are fixed on a moving platform at predetermined distances one from another.

14. The apparatus of claim 13, wherein a location of a service denying device is determined from a set of the local level transceivers in at least one quadrant of the moving platform.

15. The apparatus of claim 1, wherein the receiver is configured to receive the actual spatial distribution of the signal power from a regional data processor after the estimation and the re-estimation thereof.

16. A method comprising:
establishing a region of coverage of a transmitter wherein a spatial distribution of at least one transmitted signal parameter is known to within a degree of statistical significance;
transporting a receiver in the region of coverage to measure the transmitted signal parameter along a trajectory therein independently of another trajectory along which another receiver is transported;
estimating an actual spatial distribution from samples of the spatial distribution of the signal parameter, each of which comprising concurrent measurements of the signal parameter by the receiver and the other receiver, the actual spatial distribution of the signal parameter being continually re-estimated from additional samples of the spatial distribution of the signal parameter as the receiver and the other receiver are transported along the trajectory and the other trajectory, respectively;
determining whether the actual spatial distribution of the signal parameter is that of the known spatial distribution of the signal parameter to within the degree of statistical significance; and
generating an alert responsive to affirming that the actual spatial distribution of the signal parameter is other than the known spatial distribution thereof.

17. The method of claim 16 further comprising:
establishing the known spatial distribution of the signal parameter as that of range-squared divergence of signal power from the transmitter.

18. The method of claim 17, wherein the determining whether the actual spatial distribution is that of the known spatial distribution includes:
determining whether a difference between the actual spatial distribution and the known spatial distribution is a spatial distribution corresponding to that of the range-squared divergence of signal power from another transmitter that is closer to the receiver than the transmitter; and
generating a jamming alert responsive to affirming that the difference between the actual spatial distribution and the known spatial distribution is the spatial distribution corresponding to that of the range-squared divergence of signal power from the other transmitter that is closer to the receiver than the transmitter.

19. The method of claim 18, further comprising:
determining a geographic location of the receiver from information borne in a carrier signal as the receiver moves along the trajectory;

determining the location of the receiver on the trajectory independently of the determination of the geographic location from the information borne in the carrier signal;

comparing the independently-determined location of the receiver on the trajectory with the geographic location of the receiver; and generating a spoofing alert responsive to affirming that the independently-determined location of the receiver on the trajectory fails to coincide with the geographical location of the receiver.

20. The method of claim 16, wherein estimating the actual spatial distribution of the signal parameter includes:

assembling the measurements of the signal parameter from the receiver and the other receiver into the samples of the spatial distribution of the signal parameter; and estimating the actual spatial distribution of the signal parameter by integrating across past and present samples of the spatial distribution of the signal parameter.

21. The method of claim 20 further comprising:

fitting the integrated samples of the spatial distribution of the signal parameter to a two-dimensional representation of a region of influence of a service denying device.

22. The method of claim 16, further comprising:

receiving the actual spatial distribution of the signal power from a regional data processor after the estimation and the re-estimation thereof.

23. A non-transitory computer readable medium encoded with software comprising processor-executable instructions that, when executed by a processor, cause the processor to perform functions of:

establishing a region of coverage of a transmitter across which a spatial distribution of at least one transmitted signal parameter is known to within a degree of statistical significance;

measuring the transmitted signal parameter by a receiver moving along a trajectory in the region of coverage independently of the trajectory along which another receiver is moving;

estimating an actual spatial distribution from samples of the spatial distribution of the signal parameter, each of which comprising concurrent measurements of the signal parameter by the receiver and the other receiver, the actual spatial distribution of the signal parameter being continually re-estimated from additional samples of the spatial distribution of the signal parameter as the receiver and the other receiver are transported along the trajectory and the other trajectory, respectively;

determining whether the actual spatial distribution of the signal parameter is that of the known distribution to within the degree of statistical significance; and generating an alert responsive to affirming that the actual spatial distribution of the signal parameter is other than the known spatial distribution thereof.

24. The computer readable medium of claim 23, wherein the processor-executable instructions include additional instructions that, when executed by the processor, cause the processor to perform functions of:

receiving the actual spatial distribution of the signal power from a regional data processor after the estimation and the re-estimation thereof.

* * * * *